(12) United States Patent
Roman

(10) Patent No.: US 11,331,822 B2
(45) Date of Patent: May 17, 2022

(54) WIRELESSLY CHARGING HAIR CLIPPER

(71) Applicant: Jeam Roman, Saint Cloud, FL (US)

(72) Inventor: Jeam Roman, Saint Cloud, FL (US)

( * ) Notice: Subject to any disclaimer, the term of this patent is extended or adjusted under 35 U.S.C. 154(b) by 0 days.

(21) Appl. No.: 14/701,093

(22) Filed: Apr. 30, 2015

(65) Prior Publication Data

US 2015/0314462 A1    Nov. 5, 2015

Related U.S. Application Data

(60) Provisional application No. 61/986,297, filed on Apr. 30, 2014.

(51) Int. Cl.
| | | |
|---|---|---|
| *B26B 19/38* | (2006.01) | |
| *H02J 7/02* | (2016.01) | |
| *H02J 7/00* | (2006.01) | |
| *H02J 50/12* | (2016.01) | |
| *B26B 19/20* | (2006.01) | |

(52) U.S. Cl.
CPC ......... *B26B 19/3873* (2013.01); *B26B 19/20* (2013.01); *B26B 19/3826* (2013.01); *H02J 7/0042* (2013.01); *H02J 7/025* (2013.01); *H02J 50/12* (2016.02); *H02J 7/00* (2013.01)

(58) Field of Classification Search
CPC ..... B26B 19/3873; B26B 19/38; B26B 19/00; B26B 19/02; B26B 19/3826; B26B 19/20
USPC ............................ 30/200, 201; 320/107, 108
See application file for complete search history.

(56) References Cited

U.S. PATENT DOCUMENTS

| | | | | |
|---|---|---|---|---|
| 3,648,370 A | * | 3/1972 | Cercone .................. | B26B 19/20 30/201 |
| 3,938,018 A | * | 2/1976 | Dahl ................... | B60L 11/1812 320/139 |
| 4,614,036 A | * | 9/1986 | Haraguchi ............ | B26B 19/205 30/200 |
| 4,942,352 A | * | 7/1990 | Sano ....................... | H01F 38/14 320/134 |
| 5,054,199 A | * | 10/1991 | Ogawa .................... | B26B 19/06 30/200 |

(Continued)

FOREIGN PATENT DOCUMENTS

| | | | | |
|---|---|---|---|---|
| CN | | 2342947 Y | * | 10/1999 |
| CN | | 201201258 Y | * | 3/2009 |

(Continued)

*Primary Examiner* — Jennifer S Matthews
(74) *Attorney, Agent, or Firm* — Boudwin Intellectual Property; Daniel Boudwin

(57) ABSTRACT

A wirelessly charging hair clipper is provided. The hair clipper includes a housing that includes a plurality of blades that are driven by an electric motor to allow the plurality of blades to oscillate from side to side relative to one another to cut hair. The housing supports a receiving assembly that is electromagnetically coupled to a transmitting assembly of a charging platform to form an inductive charging system. The housing of the hair clipper is configured to be placed against the charging platform, wherein the transmitting assembly transmits a current by an electromagnetic field to the receiving assembly to recharge a battery electrically connected to the receiving assembly, thereby wirelessly charging the hair clipper. The wirelessly charging hair clipper is configured to prevent clutter by eliminating electrical wires that are constantly entangled.

1 Claim, 3 Drawing Sheets

(56) References Cited

U.S. PATENT DOCUMENTS

| | | | | |
|---|---|---|---|---|
| 5,600,225 A * | 2/1997 | Goto | | H02J 7/025 |
| | | | | 320/108 |
| 7,211,986 B1 * | 5/2007 | Flowerdew | | H02J 7/0045 |
| | | | | 320/108 |
| 7,518,337 B2 * | 4/2009 | Beart | | H02J 5/005 |
| | | | | 114/115 |
| 8,283,812 B2 | 10/2012 | Azancot et al. | | |
| 8,410,751 B2 * | 4/2013 | Terao | | H01F 38/14 |
| | | | | 320/107 |
| 8,536,737 B2 | 9/2013 | Azancot et al. | | |
| 9,472,963 B2 * | 10/2016 | Van Wiemeersch | .. | H02J 7/0042 |
| 2004/0189246 A1 * | 9/2004 | Bulai | | G06F 3/03543 |
| | | | | 320/108 |
| 2005/0017677 A1 * | 1/2005 | Burton | | H04M 19/08 |
| | | | | 320/108 |
| 2007/0182367 A1 * | 8/2007 | Partovi | | H02J 50/70 |
| | | | | 320/108 |
| 2009/0001931 A1 * | 1/2009 | Lin | | H02J 17/00 |
| | | | | 320/108 |
| 2009/0033280 A1 * | 2/2009 | Choi | | H02J 7/025 |
| | | | | 320/108 |
| 2009/0096413 A1 * | 4/2009 | Partovi | | H02J 50/40 |
| | | | | 320/108 |
| 2009/0278494 A1 * | 11/2009 | Randall | | H02J 7/0044 |
| | | | | 320/114 |
| 2010/0194336 A1 * | 8/2010 | Azancot | | G06F 1/26 |
| | | | | 320/108 |
| 2011/0018360 A1 * | 1/2011 | Baarman | | H02J 5/005 |
| | | | | 307/104 |
| 2012/0032631 A1 * | 2/2012 | Bourilkov | | H02J 7/025 |
| | | | | 320/108 |
| 2013/0026983 A1 * | 1/2013 | Yamamoto | | H02J 7/02 |
| | | | | 320/108 |
| 2013/0056017 A1 | 3/2013 | Rigsby | | |
| 2013/0285606 A1 | 10/2013 | Ben-Shalom et al. | | |
| 2014/0266019 A1 * | 9/2014 | Pigott | | H02J 7/025 |
| | | | | 320/108 |
| 2014/0333254 A1 * | 11/2014 | Teng | | H02J 7/025 |
| | | | | 320/108 |
| 2015/0246454 A1 * | 9/2015 | Mintz | | B26B 19/3873 |
| | | | | 30/124 |

FOREIGN PATENT DOCUMENTS

| | | | | |
|---|---|---|---|---|
| CN | 203135516 U | * | 8/2013 | |
| DE | 3131105 | * | 2/1983 | |
| JP | H1094685 A | * | 4/1998 | |
| WO | WO-2008109691 A2 | * | 9/2008 | ............ G06F 1/1616 |
| WO | WO-2014024380 A1 | * | 2/2014 | ......... H01F 27/2804 |

* cited by examiner

WIRELESSLY CHARGING HAIR CLIPPER

CROSS REFERENCE TO RELATED APPLICATION

This application claims the benefit of U.S. Provisional Application No. 61/986,297 filed on Apr. 30, 2014. The above identified patent application is herein incorporated by reference in its entirety to provide continuity of disclosure.

BACKGROUND OF THE INVENTION

Field of the Invention

The present invention relates to hair grooming tools and accessories. More specifically, the present invention pertains to an improved hair clipper that includes an inductive charging system to allow the hair clipper to be wirelessly charged, thereby eliminating clutter caused by entangled wires.

Generally, a hair stylist uses many different types of salon equipment in his booth. These equipment include flat irons, curling irons, and hair dryers among others. However, these salon tools are all electrically wired to a wall outlet or a power strip causing a significant amount of clutter and entanglement. This clutter is a potential hazard as a hair stylist is required to constantly move around in order to cut hair. In addition, it often is a hassle to maintain an organized booth despite the many salon devices placed in close proximity of each other. Therefore, there exists a need for a device that allows a user, such as a hair stylist, organize and clean up an area cluttered with electrical wires.

Wireless charging uses magnetic induction where a device can be placed on a surface to have it charged automatically. This is immediately appealing as a user does not have to fiddle with cables or plugs. Although the wireless charging platform itself is required to be electrically connected to a power source, the device itself does not have to be wired to the charging platform, thereby reducing the amount of plugs or cables required to recharge a device.

In short, wireless charging is inductive charging where an electromagnetic field is created to transfer energy a very short distance between two objects, specifically a transmitter and a receiver. Generally, the transmitter is usually a charging station and energy is sent from the charging station through an inductive coupling to the receiver, i.e., an electrical device, which then is used to charge the battery within the electrical device. Induction chargers typically use a transmitter induction coil to create an electromagnetic field within the charging station, and a receive induction coil within the electrical device that takes power from the electromagnetic field and converts it back into electrical current to charge the battery.

The present invention provides a wirelessly charging hair clipper that allows a user, such as a hair stylist, to wireless charge their hair clipper and prevent clutter due to the numerous electrical tools and their corresponding wires being entangled causing possible harm. The wirelessly charging hair clipper includes a housing storing an electrical motor therein, which makes the plurality of blades to oscillate from side to side relative to one another to cut hair. The wirelessly charging hair clipper further includes a receiving assembly that is electromagnetically connected to a transmitting assembly of a charging platform to form an inductive charging system. The hair clipper is configured to be placed against the charging platform, thereby allowing the transmitting assembly to transmit energy to the receiving assembly, which is used to recharge a battery within the housing of the hair clipper.

SUMMARY OF THE INVENTION

In view of the foregoing disadvantages inherent in the known types of hair clippers now present in the prior art, the present invention provides a new and improved wirelessly charging hair clippers wherein the same can be wirelessly charged through induction charging and to decrease the clutter caused by multiple wires entangled through the numerous electrical devices within a working area.

It is therefore an object of the invention to provide a new and improved wirelessly charging hair clipper that has all of the advantages of the prior art and none of the disadvantages.

Another object of the present invention is to provide a new and improved wirelessly charging hair clipper that is wirelessly charged through induction charging.

Yet another object of the present invention is to provide a new and improved wirelessly charging hair clipper that allows a user to clean up and organize a work space by eliminating the clutter caused by entangled wires from multiple electronic devices.

Still yet another object of the present invention is to provide a new and improved wirelessly charging hair clipper uses an induction charging system including a receiving assembly and a transmitting assembly configured to wirelessly charge the hair clipper.

Another object of the present invention is to provide a new and improved wirelessly charging hair clipper further comprising a charging platform that the housing of the hair clipper is placed thereagainst.

A further object of the present invention is to provide a new and improved wirelessly charging hair clipper, wherein the housing supports the receiving assembly therein and the charging platform supports the transmitting assembly therein, which are in electromagnetic communication with one another to allow for the wirelessly charging hair clipper to be recharged.

Still yet another object of the present invention is to provide a new and improved wirelessly charging hair clipper wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
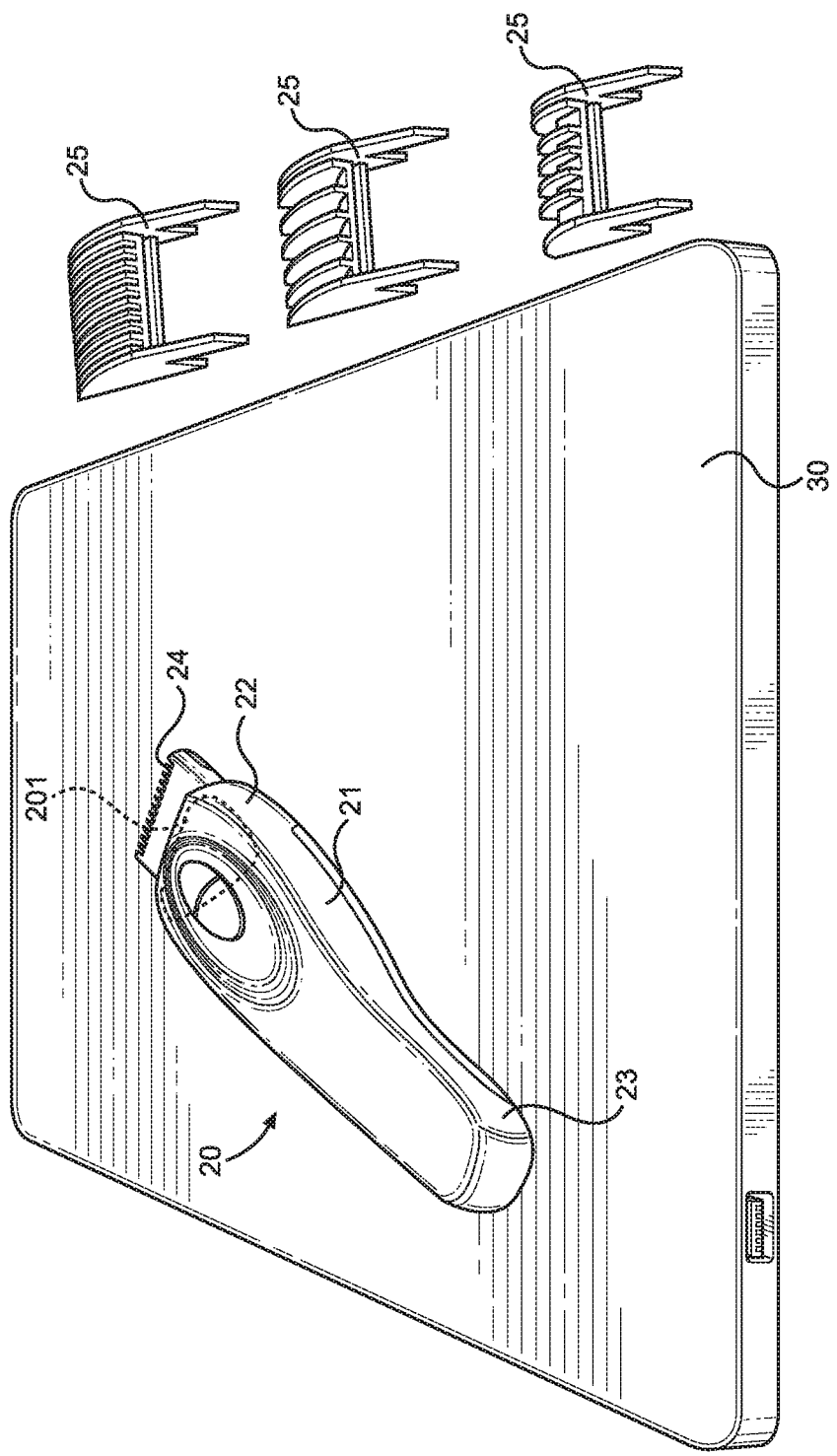
FIG. 1 shows an overhead perspective of the present invention.

References are made herein to the attached drawings. Like reference numerals are used throughout the drawings to depict like or similar elements of the wirelessly charging hair clipper. For the purposes of presenting a brief and clear description of the present invention, the preferred embodiment will be discussed as wirelessly charged by an inductive charging system. The figures are intended for representative purposes only and should not be considered to be limiting in any respect.

Referring now to FIG. 1, there is shown an overhead perspective of the wirelessly charging hair clipper 20. The hair clipper 20 includes a housing 21 that has a proximal end 22 and a distal end 23 forming an interior volume. The proximal end 22 includes a plurality of blades 24 that are configured to cut hair. The blades 24 are driven by an electric motor 201 stored within the interior volume of the housing 21, which allows the blades 24 to oscillate from side to side relative to one another to cut hair, it is contemplated that the electric motor 201 can include, but is not limited to, a rotary type, a magnetic type, and a pivot type to drive the blades 24. The proximal end 22 also includes at least one clipper guard 25 that removably attaches to the proximal end 22 to allow a user to cut a person's hair to different lengths. The distal end 23 comprises a handle that is gripped by a user's hand to allow a user to cut hair.

The interior volume of the housing 21 is also configured to support a receiving assembly that allows the hair clipper 20 to be charged wirelessly. The receiving assembly is electrically coupled with a transmitting assembly of a charging platform 30 to form an inductive charging system that allows the hair clipper 20 to be charged wirelessly. Preferably, the housing 21 of the hair clipper 20 is placed against a charging platform 30 allowing the hair clipper 20 to be wirelessly charged.

The receiving assembly therein uses at least one receiving coil to accept electrical power generated from at least one transmitting coil of the transmitting assembly. The electrical power is then converted to the appropriate current and voltage required for recharging the hair clipper 20. The hair clipper 20 is then used in the same way as a standard wired hair clipper. In this way, the hair clipper 20 is particularly advantageous as a user, such as a barber or stylist, does not have multiple running wires leading to multiple devices, which may become entangled and lead to possible injury or confusion.

The charging platform 30 comprises a rear surface and at least one side forming an interior chamber that receives the transmitting assembly that is wirelessly coupled to the receiving assembly of the hair clipper 20. The rear surface is configured to be placed against a flat surface to allow the charging platform 30 to be stably positioned. In addition, at least one of the sides of the charging platform 30 is preferably flat. This is particularly important as the hair clipper 20 is placed thereon to be wirelessly charged and therefore the rear surface and at least one side are essential to preventing the hair clipper 20 from falling off the charging platform 30. In the illustrated embodiment, the charging platform 30 is rectangular in shape, however, as aforementioned, it is contemplated that the charging platform 30 may include multiple sides as long as one side is flat.

Figure 2:
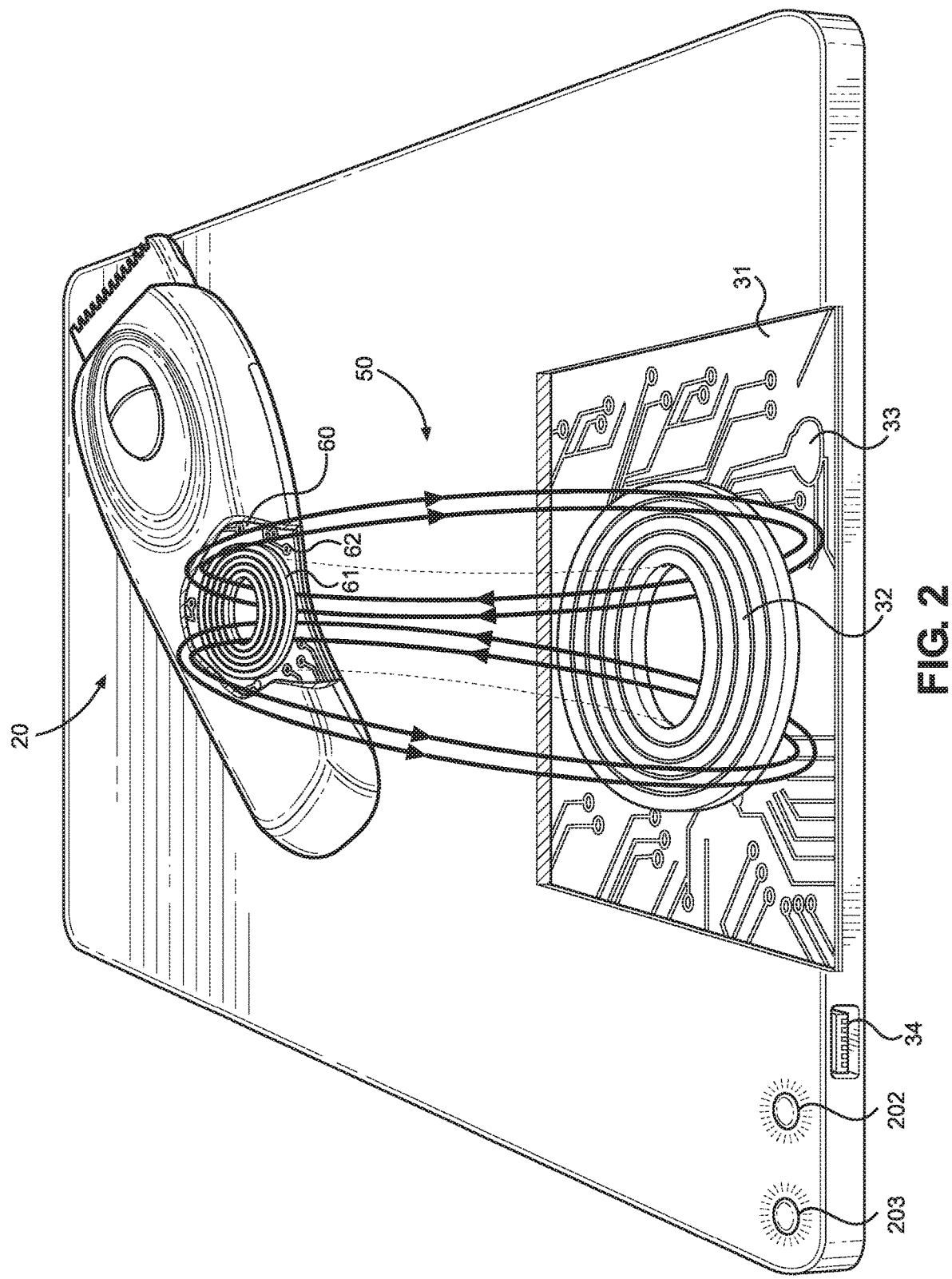
FIG. 2 shows a transparent side perspective of the present invention.
Figure 3:
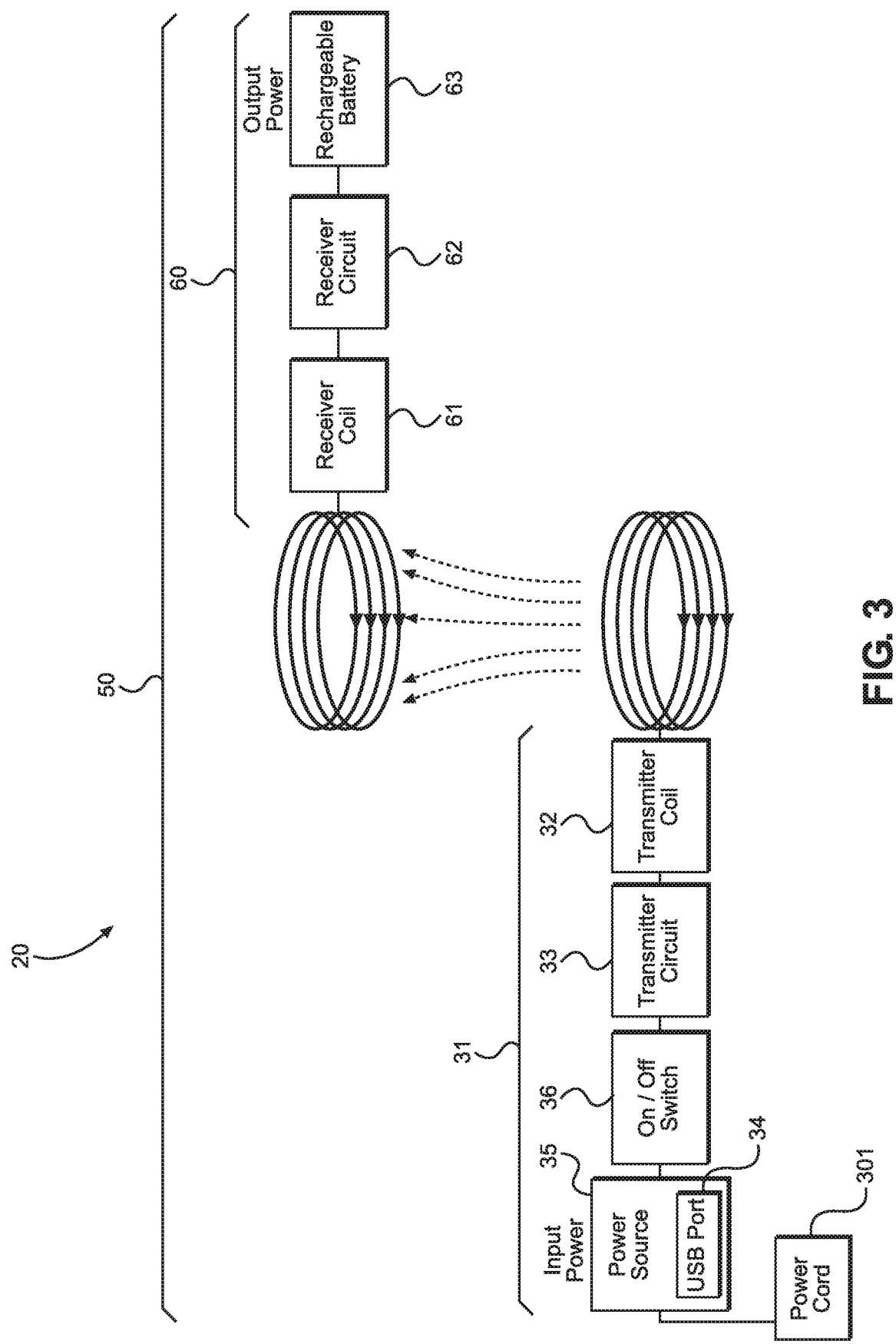
FIG. 3 shows a schematic diagram of the inductive charging system of the present invention.

Referring now to FIGS. 2 and 3, there are shown a transparent side perspective and a schematic diagram of the inductive charging system 50 of the inductive charging system 50 of the hair clipper 20. The inductive charging system 50 of the hair clipper 20 includes the receiving assembly 60 stored within the hair clipper 20 and the transmitting assembly 31 stored within the interior volume of the charging platform 30. The transmitting assembly 31 comprises an activation switch 36, a universal serial bus (USB) port 34, at least one transmitter coil 32 and a transmitter circuit 33. The USB port 34 is configured to be electrically coupled to a power source 35 and the activation switch 36. However, in alternative embodiments, the power source 35 communicates electrical power to the activation switch 36 through a power cord 301.

The power source 35 is particularly important as it inputs and provides the high frequency alternating current that is needed to charge the hair clipper 20. Preferably, power is provided to the USB port 34 through a wall outlet, however alternatives sources of energy may also be used such as an associated computer and other computer ports. In addition, the activation switch 36 is used to activate the transmitting assembly 31, and is preferably an activation button, however, other switches and buttons are alternatively used in other embodiments.

The receiving assembly 60 comprises a rechargeable battery 63, at least one receiver coil 61 and a receiver circuit 62. When the charging platform 30 is activated by the activation switch 36 and electrically powered by the power source 35, an alternating current is sent from the power source 35 to the transmitter coil 32 by the transmitter circuit 33. The alternating current flowing within the transmitter coil 32 induces an electromagnetic field that extends to a receiver coil 61 within the receiving assembly 60 of the hair clipper 20.

The electromagnetic field generates a current within the receiver coil 61 of the hair clipper 20 whereby energy is transmitted between the transmitter coil 32 to the receiver coil 61. This transfer of energy is also referred to as magnetic or resonant coupling and is achieve by both the transmitter coil 32 and the receiver coil resonating at the same frequency. The current flowing within the receiver coil 61 is converted into direct current by the receiver circuit 62, which then can be used to charge the rechargeable battery 63 of the receiving assembly 60.

Throughout the inductive charging process, the transmitter coil 32 and the receiver coil 61 can safely transfer energy over an air gap and through any non-metal surfaces which might exist between the transmitter coil 32 and the receiver coil 61. However, for the most efficient transfer of energy between the transmitter coil 32 and the receiver coil 61, the distance separating the coils 32, 61 should be minimized. It is contemplated that the addition of extra transmitter coils 32 and receiver coils 61, or larger transmitter coils 32 and receiver coils 61 can extend the range at which the energy can be transferred therebetween. In addition, the preferred embodiment further includes an indication 202, such as a light or other device, showing the user that the charging platform 30 is energized and another indication 203 to the user that the hair clipper 20 is acceptably receiving the inductive energy from the charging platform 30 and is appropriately recharging the rechargeable battery 63.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wirelessly charging hair clipper system, consisting of:
   a clipper housing having a proximal end and a distal end forming an interior volume;
   said proximal end including a plurality of blades that are driven by an electric motor stored within said interior volume configured to cut hair;
   said distal end including a handle configured to be hand gripped by a user;
   an inductive charging system comprising a receiving assembly and a transmitting assembly;
   a power source electrically coupled to said transmitting assembly;
   wherein said inductive charging system is configured to wirelessly charge by receiving power from said power source;
   wherein said receiving assembly comprises a rechargeable battery, at least one receiver coil, and a receiver circuit;
   wherein said alternating current flowing within said at least one transmitter coil induces a magnetic field that extends to said at least one receiver coil;
   said magnetic field generates a current within said at least one receiver coil whereby energy is transmitted between said at least one transmitter coil to said at least one receiver coil;
   said current flowing within said at least one receiver coil is converted into a direct current by said receiver circuit, which is then used to charge said rechargeable battery of said receiving assembly;
   wherein said interior volume is configured to support said receiving assembly therein;
   a charging platform configured to rest on a flat surface and support said transmitting assembly therein;
   wherein said charging platform comprises a rear surface, at least one side, and a continuous planar top surface forming a chamber having an interior volume configured to store said transmitting assembly;
   wherein said rear surface is placed against said flat surface;
   wherein said planar top surface is configured to allow said wirelessly charging hair clipper to be placed thereagainst.

* * * * *